US008671581B2

(12) United States Patent
Crain et al.

(10) Patent No.: US 8,671,581 B2

(45) Date of Patent: Mar. 18, 2014

(54) UNDERCUT SAW HEIGHT ADJUSTMENT, HANDLE, BLADE GUARD IMPROVEMENTS

(75) Inventors: Lance D. Crain, Fremont, CA (US); Tan D. Nguyen, Milpitas, CA (US)

(73) Assignee: Crain Cutter Company, Inc., Milpitas, CA (US)

( * ) Notice: Subject to any disclaimer, the term of this patent is extended or adjusted under 35 U.S.C. 154(b) by 0 days.

(21) Appl. No.: 13/455,495

(22) Filed: Apr. 25, 2012

(65) Prior Publication Data

US 2012/0204430 A1 Aug. 16, 2012

Related U.S. Application Data

(62) Division of application No. 12/401,839, filed on Mar. 11, 2009, now abandoned.

(60) Provisional application No. 61/035,704, filed on Mar. 11, 2008.

(51) Int. Cl.
*B23D 45/16* (2006.01)

(52) U.S. Cl.
USPC .............................................. 30/373; 30/388

(58) Field of Classification Search
USPC ................. 30/373, 376, 377, 388; 144/253.5, 144/253.8; 83/478
See application file for complete search history.

(56) References Cited

U.S. PATENT DOCUMENTS

| | | | | |
|---|---|---|---|---|
| 1,848,330 | A * | 3/1932 | Emmons | 30/376 |
| 2,558,829 | A * | 7/1951 | Dolan | 30/376 |
| 2,610,658 | A | 9/1952 | Koeling | |
| 3,716,917 | A | 2/1973 | Ruben | |
| 3,902,243 | A | 9/1975 | Klebe, Jr. | |
| 4,555,849 | A | 12/1985 | Ando et al. | |
| 5,727,322 | A | 3/1998 | Giacometti | |
| 5,741,252 | A | 4/1998 | Mazzio et al. | |
| 5,784,789 | A | 7/1998 | Vargas | |
| 5,967,013 | A | 10/1999 | McKenzie et al. | |
| 5,974,674 | A | 11/1999 | Kelly | |
| 6,588,111 | B2 | 7/2003 | Williams | |
| 6,678,960 | B2 * | 1/2004 | Williams | 30/391 |
| 7,047,650 | B2 * | 5/2006 | Chen | 30/388 |
| 7,549,279 | B2 * | 6/2009 | Merant et al. | 56/15.6 |
| 2003/0010176 | A1 | 1/2003 | Chiang | |
| 2008/0264225 | A1 | 10/2008 | Crain et al. | |

* cited by examiner

*Primary Examiner* — Kenneth E. Peterson
(74) *Attorney, Agent, or Firm* — Thomas Schneck

(57) ABSTRACT

An undercut saw including a motor, a drive shaft rotated by the motor, a blade mount mechanically linked to the drive shaft, the blade mount allowing a saw blade to be mounted and a fixed blade guard circumscribing a portion of the saw blade. The fixed blade guard includes a top plate and a height adjustment skirt in telescoping attachment joined by fasteners. A guide washer with a fastener assembly is configured to move up and down in a slot on the height adjustment skirt. Turning a lead threaded member raises and lowers the top plate.

8 Claims, 14 Drawing Sheets

UNDERCUT SAW HEIGHT ADJUSTMENT, HANDLE, BLADE GUARD IMPROVEMENTS

CROSS-REFERENCE TO RELATED APPLICATION

This is a divisional application of pending U.S. patent application Ser. No. 12/401,839 filed Mar. 11, 2009, which application claims priority from U.S. provisional application No. 61/035,704, filed Mar. 11, 2008.

TECHNICAL FIELD

The invention relates to power tools and more specifically to power tools for installation of flooring.

BACKGROUND ART

An undercut saw is a specialty circular power saw used by flooring installers for undercutting walls, moldings, door jams, and cabinetry so that new floors may be installed underneath. When the area is undercut using the saw, the new flooring is simply slid underneath the undercut area, which saves time and presents a visually appealing finish. Without an undercut saw, the flooring should be precisely cut to fit around these areas, which is laborious, costly, and often leaves unsightly gaps.

Most existing undercut saws have been constructed with a fixed blade guard assembly which consists of two telescoping parts that serve both as a blade guard and a height adjustment mechanism for the saw. As shown in FIG. 1, existing undercut saw 100 has a fixed blade guard assembly 120 consisting of a first top plate 140 and a second height adjustment skirt 160. Top plate 140 is fixedly joined to a rotary power unit 180 (commonly circular saw or grinder based power units). When movable guard 200 is retracted, the front of the top plate 140 preferably covers less than 180 degrees of the circular saw blade 220 so the saw 100 can operate in tight areas, such as inside corners. The back of the top plate 140 has a downwardly protruding back edge 240 which is typically semi-circular so that it can be precisely machined to a controlled outside diameter. The downwardly protruding back edge 240 of the top plate 140 mates with an inner surface 260 formed in the height adjustment skirt 160 which is also semi-circular. These two mating semi-circular parts may telescope up and down creating a height adjustment mechanism for existing undercut saw 100, while also providing a fixed blade guard assembly 120 surrounding the back of the blade 220. Base 450 is an integral part of height adjustment skirt 160. The bottom surface 451 of the base 450 forms the surface upon which the saw is placed while in use on a floor surface.

There are practical considerations of this existing height adjusting mechanism with respect to the fasteners used to hold the telescoping members at a desired height. The following is a history of various fastener combinations that have been used. In existing early model undercut saws, the fasteners used were carriage bolts socketed into square holes in the downwardly protruding back edge 240 of the top plate 140. The carriage bolts extending from the back of the top plate passed through slots in the height adjustment skirt forming threaded ends for mounting additional fasteners. First mounted on these threaded ends were so-called “guide washers”, which were specialized cast shapes designed to move within channels formed on a back surface of the height adjustment skirt. Last mounted on these threaded ends were wing nuts which were tightened down on the guide washers. The clamping force generated by the wing nuts pressured the guide washer against an outer surface of the height adjustment skirt, while the downwardly protruding back edge of the top plate was drawn against the inner surface of the height adjustment skirt by the pulling action of the carriage bolt. This clamping force frictionally held the top plate at a desired height within the height adjustment skirt.

In some more recent existing saws, one of which is shown in FIG. 1, the fasteners consisted of two threaded wing screws 280 which fastened into two tapped holes 300 in the downwardly protruding back edge 240 of top plate 140. Spring 340 and washer 360 were also mounted on wing screw 280 ahead of guide washer 320. Spring 340 and washer 360 pressure guide washer 320 against the curved outer surface 305 of the height adjustment skirt 160 within an outer guide washer channel 380. Thus, even when a wing screw 280 is loosened, pressure from the spring keeps the guide washer in its channel, providing at least some stability and guidance for the assembly during the adjustment process.

Existing guide washers have typically been generally trapezoidal cast shapes with a semi-circular inside surface 315 that precisely mates with the curved outer surface 305 within guide washer channel 380 of the height adjustment skirt 160. Two or three guide washers along with two or three sets of the aforementioned fasteners have been used on existing saws.

Since the rotary power unit 180 and rotatable circular saw blade 220 are fixedly assembled onto top plate 140, the height at which top plate 140 is frictionally held by the fasteners determines the height of cut. The top plate 140 may be frictionally held at any point in a vertical range of about one inch within the height adjustment skirt 160. This enables the height of cut for circular saw blade 220 to be set from floor level (i.e., flush to the floor or no height of cut) to a height of one inch above floor level.

The characteristics of these guide washer and fastener mechanisms for these existing height adjustment mechanisms are as follows: First, the guide washers sometimes do not frictionally hold the assembly together with sufficient force, and the top plate can shift within the height adjustment skirt as the saw is being used. Particularly as the user lifts and places the saw at various locations around a jobsite, the weight of the saw motor can cause the top plate to slip downward within the height adjustment skirt. As a result, in some places the undercut is not of sufficient height, and the user has to re-adjust and re-cut many areas.

Another characteristic of the existing fastening mechanisms and guide washers is that they do little to ensure that the top plate (and thereby the blade) is always parallel with the flat floor surface on which the saw rests during use. The blade should be kept parallel to the floor during undercutting so that the blade will not angle up or down in relation to the floor during a cutting operation. Keeping the blade parallel with the floor surface ensures that the height of undercut will be consistent. Otherwise, angling of the blade may cause the blade to wedge upward or downward. This can result in inconsistent height of cut. Angling of the blade can also bog down the motor during a cutting operation, or even cause the saw to kick back. An improved height adjustment mechanism that worked to prevent the top plate from being set at angles that are not parallel to the floor could prevent undesirable inconsistencies in the height of cut, and would promote safer usage by reducing the possibility of saw kickback.

The use of such existing telescoping height adjustment mechanisms fastened with guide washers and threaded fasteners was preferred for simplicity and low cost. However, various different mechanisms for setting and holding the height of cut for an undercut saw have been designed to address slippage and blade angling during use. Such designs have largely not been adopted because they were impractical for jobsite conditions or too expensive to manufacture. For example, U.S. Pat. No. 5,784,789 to Vargas discloses an undercut saw with a rack-and-pinion mechanism for height adjustment. The undercut saw of this disclosure employs a grinder based power unit. A circular saw blade is mounted onto its spindle. A cylindrical sleeve is mounted to the grinder motor to cover the rotating spindle. The sleeve has a rack formed in its back side. The sleeve is assembled into a base. The base holds the pinion. Thus, as the pinion is turned, the rack on the sleeve causes the power unit and blade to move up or down. The rack and pinion design ensures that blade will move up and down in a precise manner that keeps the blade parallel with the floor at all times. Two screws threaded through the base may contact the sleeve to fix the sleeve at a given height. The rack and pinion mechanism of saw proved too expensive for mass production, and was prone to binding from saw dust. As a result, it was not widely adopted.

U.S. Pat. No. 6,678,960 to Williams discloses an undercut saw with a housing which rests on a floor surface and itself has a fixed height. A tapped sleeve is mounted on top of the housing. A rotary motor with a central axis and a threaded case may be threaded into the tapped sleeve. The blade when mounted on the central motor armature axis may be moved up and down within the housing as the threaded case is turned within the tapped sleeve. The height is fixed by means of a jam nut also threaded onto the threaded case. This threaded adjustment mechanism ensures that the blade will be kept parallel to the floor at all times. The tapped sleeve and large threads on the motor housing of this design proved too expensive for mass production. This mechanism was also prone to binding from saw dust. Furthermore, the requirement that the blade be mounted on a central armature axis about which the entire assembly turned required that only motors such as routers having a single, central armature axis (without any offset spindle gear) could be employed. Such high RPM low torque motors are not powerful enough for large amounts of undercut sawing. In particular, a great deal of power is used by a saw to undercut an inside corner area. Williams' saw as disclosed could not perform such cuts, due to its bulky blade housing.

Other mechanisms for fixing the height of cut are disclosed within this application, including rack-and-pinion, frictional, interlocking, and lead screw mechanisms. With regard to Williams' lead screw mechanism, this is shown in FIG. 9 of Williams. Williams describes the mechanism as a "jack screw" 160 rotatably fastened onto an outer sleeve 63 on two bosses 151. When a knob 155 is turned, a teeter 161 having a lead nut 160 may be raised or lowered. Teeter 161 has an arm 162 with a thin end 67 which may pass through a slot through the case and engage a cavity 37 in the case 30. Spring 166 biases teeter into cavity 37. However, a separate tightening clamp 76 may close down the diameter of sleeve 63 to frictionally hold the case.

A lead screw mechanism such as Williams' "jack screw" generally requires a secondary holding mechanism besides the lead screw to hold the mechanism in position. Otherwise, an accidental bump on the lead screw knob or even vibration during use can cause the mechanism to shift unexpectedly. For Williams, the separate frictional mechanism of clamp 76 provides such a secondary holding mechanism.

Williams' jack screw design presents many manufacturing challenges that make it cost prohibitive. Much as with the threaded case of the embodiment previously discussed, Williams jack screw embodiment has a specialized motor housing having a precisely shaped outer "case" capable of sliding within a sleeve. This is not preferred as most commonly available power units come in the shape of a grinder or circular saw, and such power units have no such precisely shaped case. Furthermore, the tightening clamp used to frictionally hold the case within the sleeve is a large, tight tolerance slide fit mechanism which would entail high machining cost to produce. A lead screw mechanism which did not engage the case of the power unit would be preferred as just about any power unit could be employed.

A lead screw mechanism that worked in conjunction with existing low cost guide washers and fastener assemblies could provide additional support for the existing telescoping top plate and height adjustment skirt at a much lower cost. Such would be preferred as a low cost mechanism to provide the benefits of reduced slippage and angling of the blade. Williams teaches that "peripheral studs" (carriage bolt or wing screw fastener assemblies) or "wing nuts", are "slow because several fasteners require adjustment" (Background of the Invention, paragraph 3).

Some existing undercut saws have been manufactured with a grinder motor as a power unit. As shown in FIG. 2, grinder motor 370 has a first axis of rotation 375 (long armature axis) operatively coupled to a perpendicular second axis of rotation 385 (spindle axis). A first handle 380 and switch 400 are typically located towards the back of the saw. A spindle housing 420 is typically located at the front of the saw. Spindle housing 420 is typically made out of aluminum, which is suitable for mounting a second, forward, movable handle for controlling the front of the saw.

Existing grinders typically have a second handle formed in the shape of a threaded post fastenable into tapped holes on either side of the aluminum spindle housing. Such threaded posts extend out quite a distance from either side of the spindle housing, which is preferred during a grinding operation to provide counter leverage for the user. However, such a handle assembly is not suitable for use in undercut saws. The extension of the handle prevents the saw from entering tight areas, such as inside corners.

For this reason, as shown in FIG. 2, existing undercut saws have been made with a narrow, plastic, U-shaped handle such as handle 440 for their second, forward, movable handle. U-shaped handle 440 is bolted into tapped holes 500 on both sides of spindle housing 420 with bolts 480 and lock washers 460. U-shaped handle 440 is preferably narrower than the width of top plate 140 below so that it does not prevent the saw from undercutting in tight areas, such as inside corners.

The use of bolts 480 and lock washers 460 to bolt a second, forward, movable handle, such as U-shaped handle 440, to spindle housing 420 is preferred for simplicity and low cost. The user can tighten down the bolts 480, and the lock washers 460 tend to hold the handle in place. The handle 440 can also be rotated backward (i.e., towards the first, back handle 380) whenever the saw is used to undercut in a low clearance area, such as underneath the toe-space of a cabinet.

However, if the user pushes excessively hard on U-shaped handle 440, it can rotate forward (towards blade 220). This is not preferred as this puts the user's hand in closer proximity to blade 220. Forward rotation is also not preferred, because whenever the handle is oriented at such an angle, the saw is less able to operate in tight areas, such as inside corners. Some added mechanism to prevent the forward handle of the saw from rotating forward from the normally preferred 90 degree angle would be a usability and safety improvement. A more solid handle and better mounts on the spindle housing could provide such an improvement. However, as previously explained, this handle should also be able to rotate backward for undercutting beneath a toe-space.

An undercut saw is primarily used to undercut walls, door jams, and cabinet areas so that new flooring materials may be fit underneath. Some flooring materials are very thin, such as sheet vinyl or linoleum. To provide the proper undercut for thin sheet vinyl, the undercut saw should cut flush to the floor. For this reason, in most existing saws, as shown in FIG. 3 (a bottom view of an existing undercut saw), fixed blade guard assembly 120 (comprised of top plate 140, and height adjustment skirt 160) and movable guard 200 are both open on the bottom. This allows the blade height to be adjusted as close to the floor as possible. However, the undercut saw is not always used to undercut flush to the floor. In many cases, such as for ceramic tile or hardwood plank flooring, the undercut is made higher, because the flooring material to be installed is thicker. In such cases, additional guarding structures may be added to increase safety. Such structures may be removably mounted onto the components comprising the fixed blade guard, or the movable blade guard, to cover more of the blade when the saw is not being used for undercutting to fit thin materials, such as sheet vinyl.

It is an object to provide an undercut saw with an improved mechanism for guiding the telescoping motion of the top plate and the height adjustment skirt so that during height adjustment the top plate tends to stay parallel with the base of the saw, thereby keeping the blade parallel to the floor surface upon which it is placed during use.

It is an object to provide an undercut saw with an improved mechanism for holding a top plate at a fixed elevation within a height adjustment skirt which is economical enough for mass production.

It is an object to provide an undercut saw with an improved handle fastening mechanism which may be more rigidly fixed to the spindle housing of a grinder motor, which may be adjusted to various angles, but stopped from certain angles that are not preferred.

It is an object to provide an undercut saw with additional safety mechanisms which may be removably mounted to the fixed and movable guards.

SUMMARY

The device has several embodiments including an undercut saw with a fixed guard assembly comprising a telescoping top plate and height adjustment skirt, with some embodiments including improved guide washers including an added guide washer slot runner. Certain other embodiments include a lead screw mechanism threaded vertically through the guide washer to assist in setting and holding a height of cut. In certain other embodiments having a right angle grinder motor for their power unit, the saw includes a handle with a pattern of teeth encircling a hole in the handle for mounting the handle to the saw's spindle housing. In addition, a similar pattern of interlocking teeth is formed at a handle mount location on at least one side of the saw's spindle housing. The teeth on the handle and the spindle housing may thus interlock to allow the handle to be fixedly joined at a range of preferred angles. The handle and the spindle housing may additionally include certain bosses acting as stops to prevent the handle from being rotated forward to certain angles which are not preferred. Certain other embodiments include removable cover plates covering the blade to increase safety which may be removed to enable the saw to cut flush to a floor surface.

The improved guide washer may incorporate any one of several added features. The first feature, which will be described herein as a "guide washer slot runner", is a boss or projection extending from the inner surface of the guide washer. This projection is sufficiently long and has a precise width to extend (with a small degree of play) into its corresponding slot in the height adjustment skirt. In existing saws, the slots in the height adjustment skirt served only to allow passage of the bolts extending through the guide washers to fasten into the downwardly protruding back edge of the top plate. The added guide washer slot runner extends into and may contact the edges of the slots in the height adjustment skirt to guide the telescoping motion of the top plate and the height adjustment skirt during adjustment. This helps keep the base of the height adjustment skirt parallel to the top plate. This helps ensure that the top plate will be adjusted in a manner that keeps the blade parallel to the floor surface.

The guide washer may include an additional tapped hole through a vertical cross section, for receiving an added threaded member. This threaded member may be rotatably fastened on the base of the saw's height adjustment skirt using a collar or other nut type fastener. This threaded member thus forms a lead screw mechanism capable of lifting or lowering the guide washer (and thereby the top plate and blade). Such a lead screw mechanism may be included on one or more guide washers in the assembly, though it is preferred they be used on all such guide washers. This is so the height of cut can be adjusted incrementally on all sides through equal turns of all threaded members. The threaded members provide added support to hold the desired height of cut and prevent slippage. The guide washers may still include the existing fasteners such as wing screws threading into the downwardly protruding back edge of the top plate to provide a second frictional mechanism to hold the height of cut.

In embodiments including a grinder motor for a power unit, the second, forward, movable handle may be affixed to the spindle housing with corresponding circular patterns of interlocking teeth on one or more sides of the handle and the spindle housing. In one embodiment, a two piece handle assembly is provided, made in two halves joined by a pivot pin. The pivoting action of the halves allow the assembly to be closed or opened to enable interlocking or disengagement of the circular tooth patterns on the handle and the spindle housing. When these circular tooth patterns are interlocked, a secure joint is produced between the components preventing unexpected rotation during use. The handle may be pivoted open for adjustment backward to a number of angles to enable the saw to be used in low clearance areas, such as under toe spaces. Added stops on the handle and the spindle housing prevent the handle from rotating to forward angles (acute angles less than 90 degrees) in relation to the long armature axis of the saw.

For improved guarding, removable cover plates may be added to the bottom of the downwardly protruding back edge of the top plate, the bottom surface of the height adjustment skirt, or the movable guard. These cover plates may be removed to enable flush cutting when installing thin flooring materials, such as sheet vinyl.

DETAILED DESCRIPTION

Figure 4:
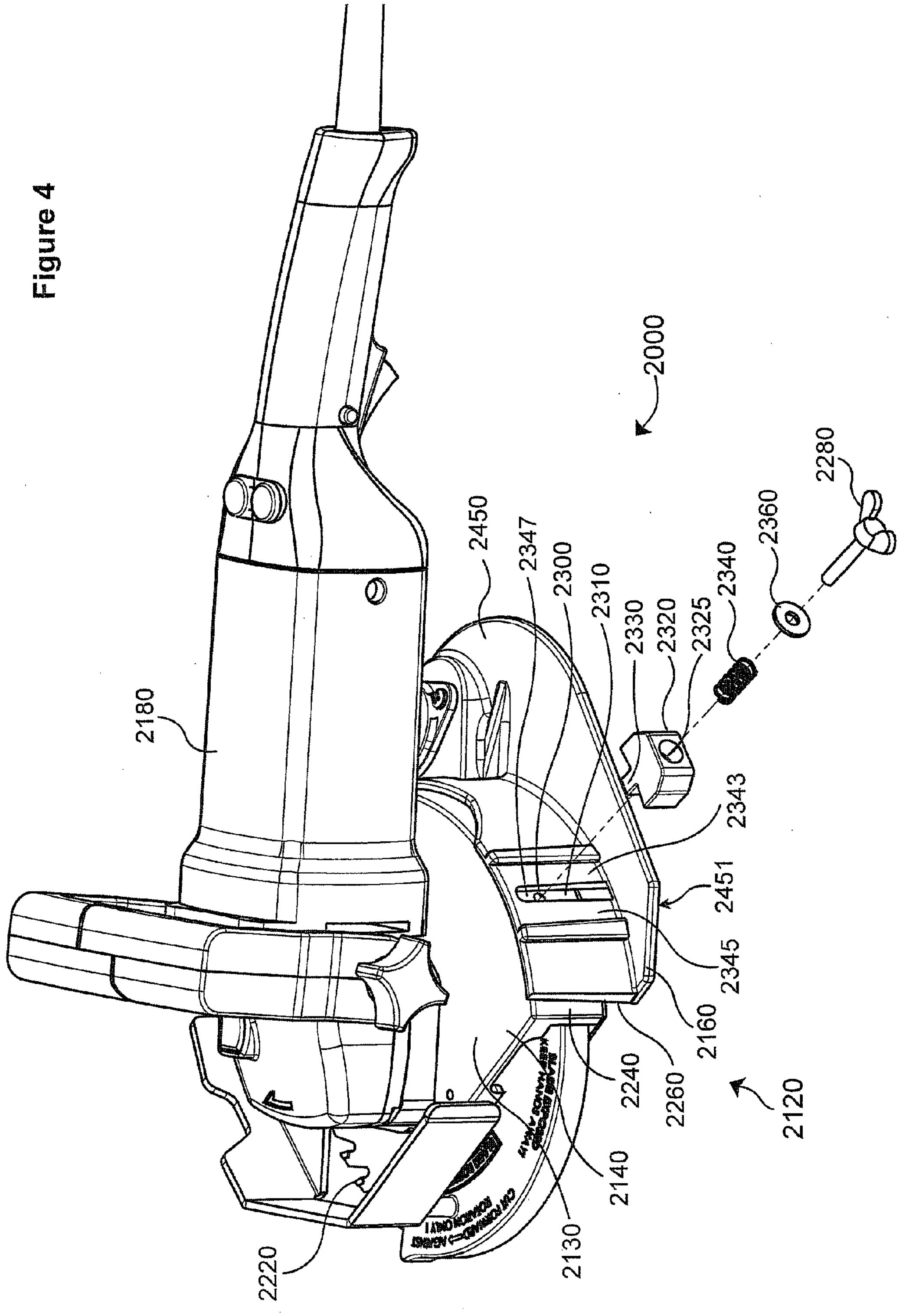
FIG. 4 is a side view of an undercut saw including an improved guide washer having an added guide washer slot runner.

As shown in FIG. 4, undercut saw 2000 has a fixed blade guard assembly 2120 which consists of two parts: a first top plate 2140 and a second height adjustment skirt 2160. A rotary power unit 2180 is fixedly attached to top plate 2140. In the illustrated embodiment, the power unit is a grinder motor. However, other embodiments may include other types of power units attached to the top plate, including circular saw or router type power units. Blade 2220 is mounted on the spindle of rotary power unit 2180 using a blade mount (not shown) which keeps it parallel to a substantially flat top face 2130 of top plate 2140.

Top plate 2140 has a downwardly protruding back edge 2240 which forms a semi-circular vertical edge surface. Height adjustment skirt 2160 has an inside face 2260 which also forms a corresponding semi circular vertical edge surface. The downwardly protruding back edge 2240 of top plate 2140 and inside face 2260 of height adjustment skirt 2160 together form precisely mating telescoping surfaces. Base 2450 is an integral part of height adjustment skirt 2160. Base 2450 has a bottom surface 2451 which is the surface upon which the saw rests or is moved while in use.

Figure 10:
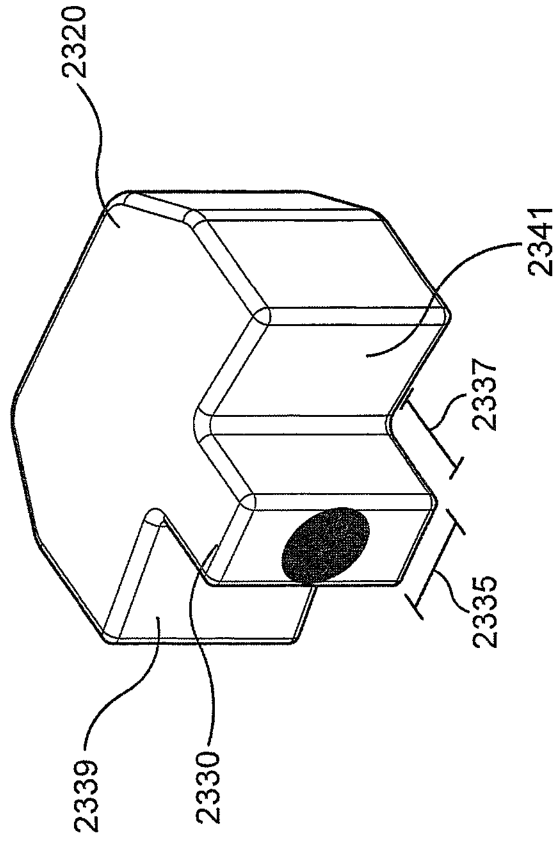
FIG. 10 is a perspective view of a guide washer including the added guide washer, slot runner.

To fix the height of top plate 2140 in relation to base 2450, top plate 2140 has a tapped hole 2300 which is centered in the location of a corresponding slot 2310 in height adjustment skirt 2160. Wing screw 2280 extends through a horizontal hole 2325 in guide washer 2320 and is threaded into tapped hole 2300 in downwardly protruding back edge 2240 of top plate 2140. Guide washer 2320 has an added guide washer slot runner 2330. As shown in greater detail in FIG. 10, guide washer 2320 includes a guide washer slot runner 2330 having a width 2335 slightly narrower than slot 2310 (FIG. 4) in height adjustment skirt 2160 (FIG. 4). This is so it can enter this slot with a slight amount of play. Guide washer slot runner 2330 has a length 2337 long enough to enter slot 2310 (FIG. 4). In a preferred embodiment, as shown in FIG. 4, guide washer slot runner 2330 is long enough that, once wing screw 2280 is tightened down on the outer surface of the guide washer, guide washer slot runner 2330 contacts surface 2347 (on downwardly protruding back edge 2240 of top plate 2140—exposed within slot 2310). As shown in FIG. 10, guide washer 2320 includes radial shaped faces 2339, 2341 designed to rest flush against a corresponding radially-shaped vertical face 2343 (FIG. 4) of guide washer channel 2345 (FIG. 4). These large corresponding contact surfaces are used to apply and control frictional holding force between the components. As shown in FIG. 4, spring 2340 along with washer 2360 may be mounted on wing screw 2280 ahead of guide washer 2320.

In this embodiment, guide washer slot runner 2330 runs in a slot 2310 to guide the motion of height adjustment skirt 2160 during height adjustment. Others skilled in the art might imagine similar combinations of slots through the height adjustment skirt and bosses (guide washer slot runners) on an inner face of the guide washer which could run in the slots to perform the same function. Such may include multiple slots in the outer face of the height adjustment skirt, for multiple guide washer slot runners on an inner face of the guide washer. One such slot may be the slot provided for passage of a fastener used to fasten the top plate within the height adjustment skirt. Alternatively, the slot may have no other function than for receiving the boss forming a guide washer slot runner. The slot itself may be a slot or a groove of only partial depth in the outer surface of the height adjustment skirt performing the same function of receiving a slot runner. However, the embodiment of FIG. 4 is preferred. Multiple slots weaken height adjustment skirt 2160, making it prone to breakage if the undercut saw 2000 is dropped. A single, central guide washer slot runner running within a single slot centers and controls the assembly on a single vertical axis. Multiple axes would require tight tolerances on a larger number of surfaces, adding unnecessary expense.

Figure 3:
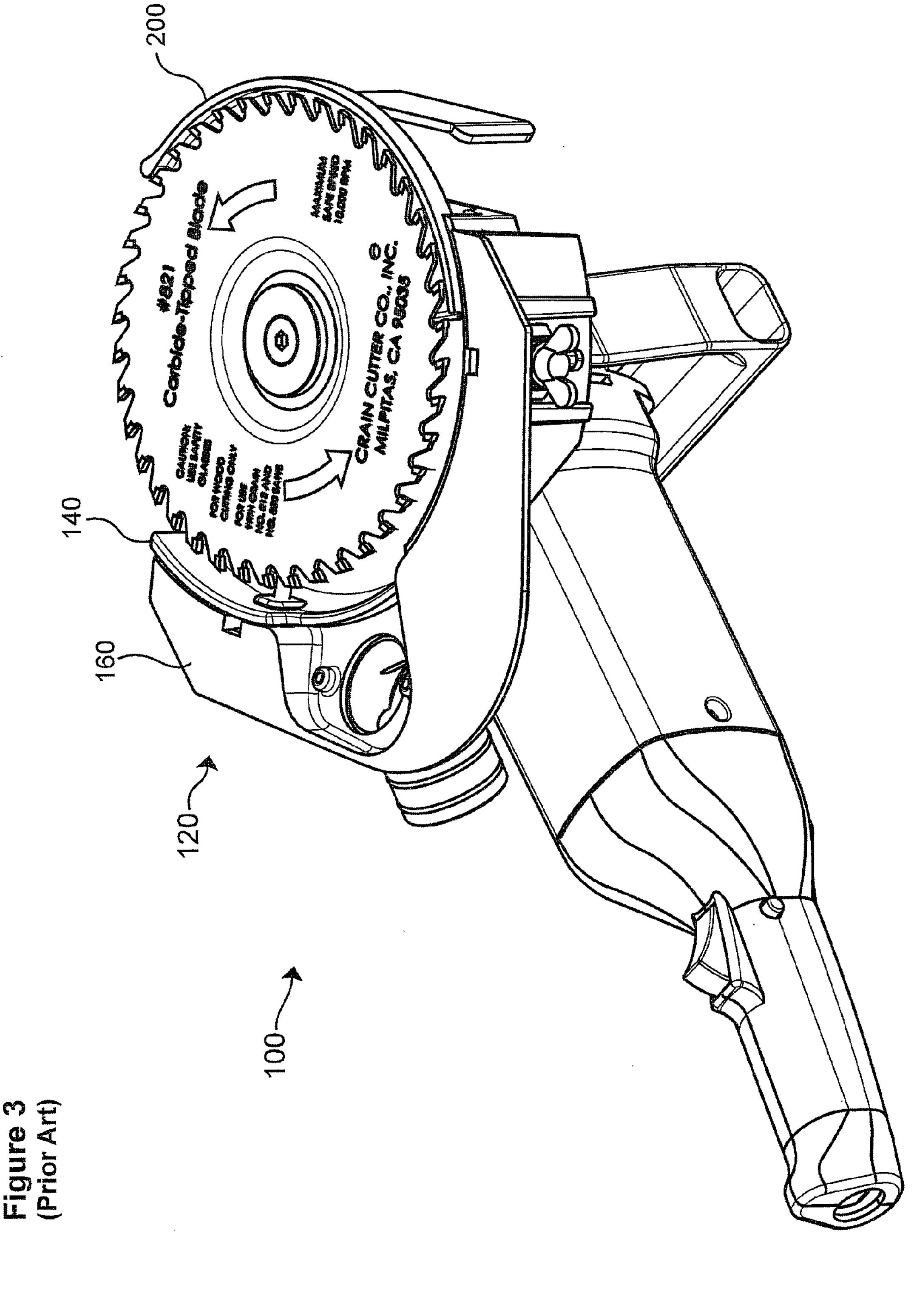
Figure 3 (Prior Art)
FIG. 3 is a bottom perspective view of an existing undercut saw showing how the fixed guard assembly and movable guards are open at bottom to enable flush cutting.

In this embodiment, when height adjustment is performed, normally the saw is turned upside down and rested on the second, forward, movable handle (as shown as undercut saw 100 of FIG. 3). Afterwards, wing screw 2280 is loosened, and the height adjustment skirt 2160 is free to telescope up or down. Guide washer slot runner 2330 remains in slot 2310 and is pressed up against downwardly protruding back edge 2240 due to pressure from spring 2340. As height adjustment skirt 2160 is moved up or down, the outer edges of guide washer slot runner 2330 guide its motion through contact with the inside edges of slot 2310. This guidance ensures that the height adjustment skirt will be guided up or down in a substantially vertical direction. Top plate 2140 thus tends to stay parallel to base 2450. Thus, the blade will be kept parallel to the base during adjustment. When the desired height is set, wing screw 2280 may be tightened down on guide washer 2330, pressing it against the inner surface of guide washer channel 2345 of height adjustment skirt 2160, and in turn drawing the downwardly protruding back edge 2240 of top plate 2140 against inside face 2260 of height adjustment skirt 2160. This clamping pressure on the components frictionally holds the desired height of cut.

Figure 9:
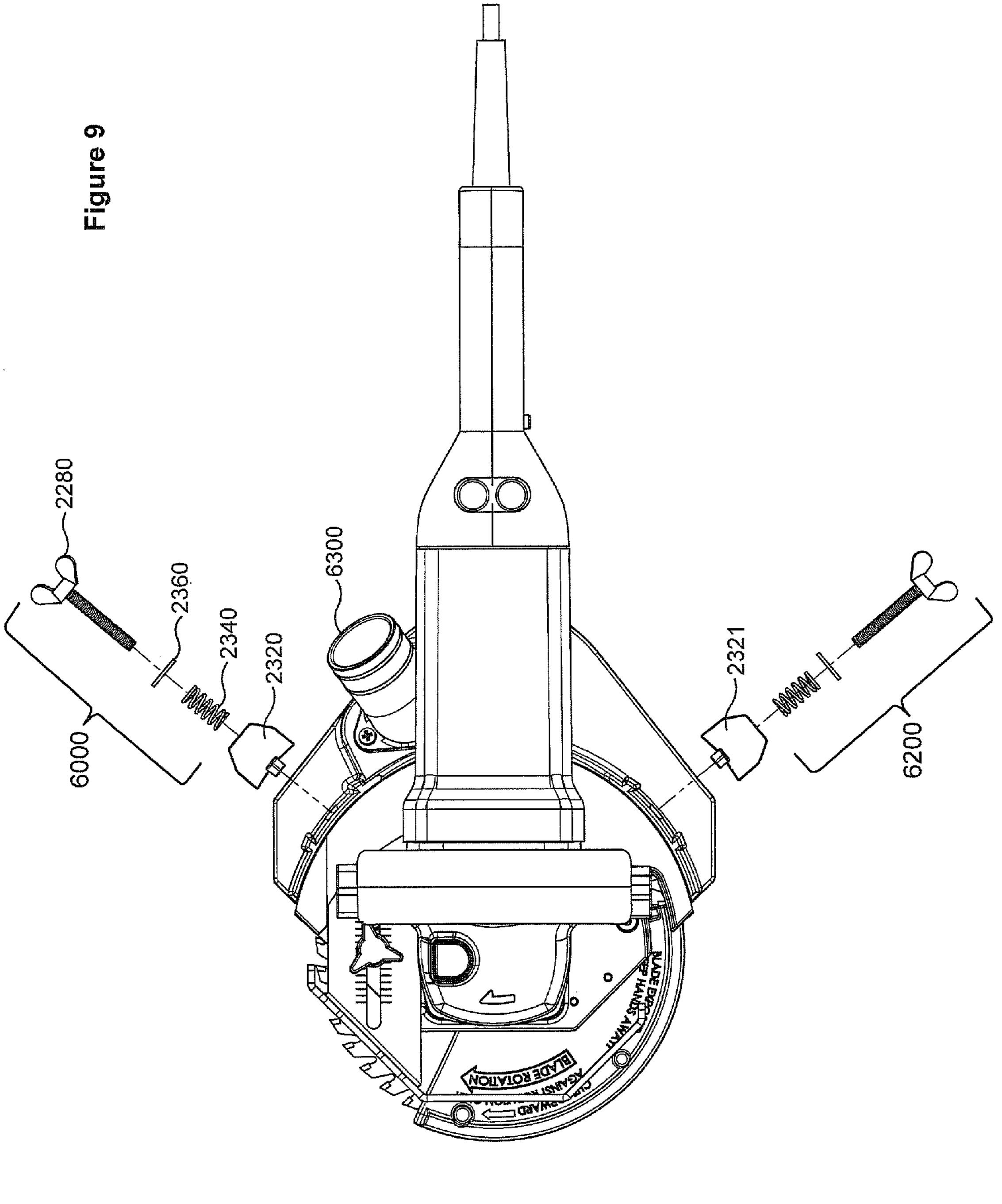
FIG. 9 is a top view of the undercut saw showing the preferred locations where the two guide washer assemblies may be fastened through the height adjustment skirt and into tapped holes in the downwardly protruding back edge of the top plate.

As used herein, and as shown in FIG. 4, the term "guide washer fastener assembly" includes at least one threaded fastener (such as wing screw 2280). The guide washer fastener assembly is used in conjunction with a guide washer, but the guide washer itself is considered a separate element. In one embodiment, the guide washer fastener assembly includes only wing screw 2280. In a preferred embodiment, the guide washer fastener assembly additionally includes a washer 2360 installed first on the wing screw 2280, followed by a spring 2340. In some embodiments, one or more guide washer fastener assemblies may be included, used in conjunction with one or more guide washers. However, in one embodiment, such as shown in FIG. 9, only two such guide washer fastener assemblies 6000, 6200 are included, (comprising wing screw 2280, washer 2360, and spring 2340). Guide washer fastener assemblies 6000, 6200 are used in conjunction with two guide washers 2320, 2321. The use of only two such fastener assemblies with two guide washers provides ample clamping force on both sides of fixed blade guard assembly, yet leaves room for other saw features, such as dust port 6300. Persons skilled in the art may envision the use of other fastener combinations which may be used to form a guide washer fastener assembly. For example, another embodiment of a guide washer fastener assembly may include carriage bolts and wing nuts used in conjunction with guide washers, as has been described in existing references.

As shown in FIG. 4, wing screw 2280 along with tapped hole 2300 work to generate clamping force to frictionally hold the downwardly protruding back edge 2240 of the top plate 2140 against the inner surface 2260 of height adjustment skirt 2160. This holds the height of the top plate 2140 relative to the bottom surface 2451 of base 2450 of height adjustment skirt 2160. Since the rotary power unit 2180 and rotatable circular saw blade 2220 are fixedly assembled onto top plate 2140 when the saw is assembled, the height of the top plate 2140 determines the height of cut. The top plate 2140 may be adjusted and frictionally held in a vertical range of about one inch within the height adjustment skirt 2160. This enables the height of cut for circular saw blade 2220 to be set from floor level (i.e., flush to the floor or no height of cut) to a height of one inch above floor level. In this embodiment, the added guide washer slot runner guides the motion of the height adjustment skirt to help ensure that the blade will be kept parallel to a floor surface. This prevents angling of the blade. However, the frictional holding mechanism of this embodiment may not be sufficient to hold a desired height of cut. Additional support mechanisms may be added to hold a desired height of cut.

Figure 8:
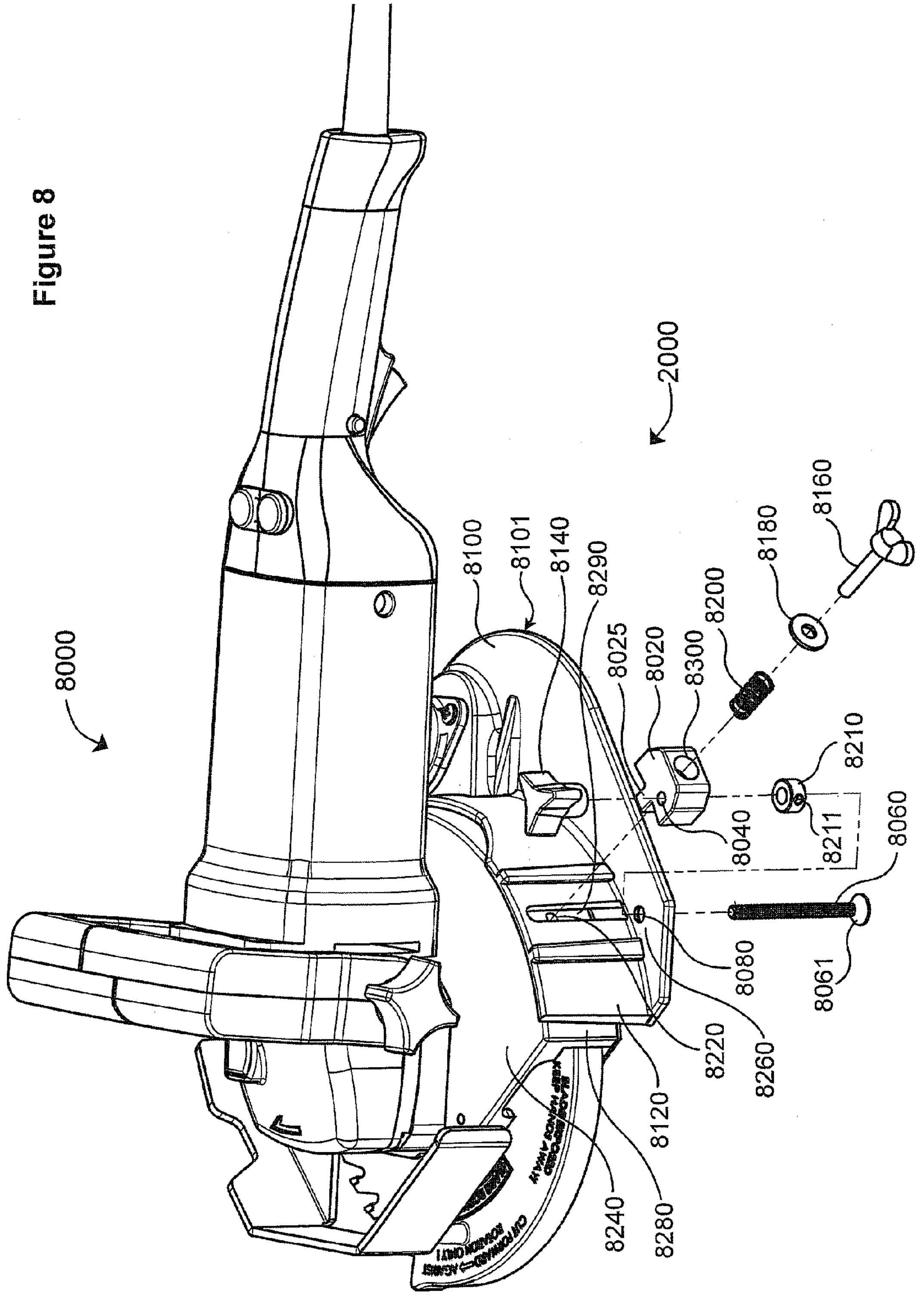
FIG. 8 is a side perspective view of an undercut saw including an improved guide washer with guide washer slot runner and additionally including a threaded member threading through a vertically tapped hole in the guide washer forming a lead screw mechanism.

As shown in FIG. 8, additional support mechanisms may be added by including an added vertical tapped hole in the body of the guide washer, which in conjunction with an added threaded member may form a lead screw mechanism capable of raising or lowering the guide washers (and thereby the top plate and blade). Undercut saw 8000 includes a guide washer 8020 including a tapped hole 8040. A threaded member such as pan head screw 8060 is inserted through a hole 8080 in the base 8100 of height adjustment skirt 8120. Hole 8080 may be countersunk on its bottom side (not shown) such that the pan head 8061 of pan head screw 8060 sockets flush within the countersink. Thus, base 8100 will be a uniform flat surface on its bottom side 8101, which will not catch on floor surface irregularities.

Once inserted in hole 8080, pan head screw 8060 extends vertically up from base 8100 and may be threaded into tapped hole 8040 in guide washer 8020. Next, collar 8210 is fastened onto pan head screw 8060 at an elevation forming a slight gap between the bottom of collar 8210 and a top surface 8260 of base 8100. This gap enables pan head screw 8060 to rotate within hole 8080. (More secure, lower cost alternatives exist for pan head screw 8060 and collar 8210 will be described later.) Finally, for ease of turning, a knob such as three arm knob 8140 may be fastened on top of pan head screw 8060.

Figure 12:
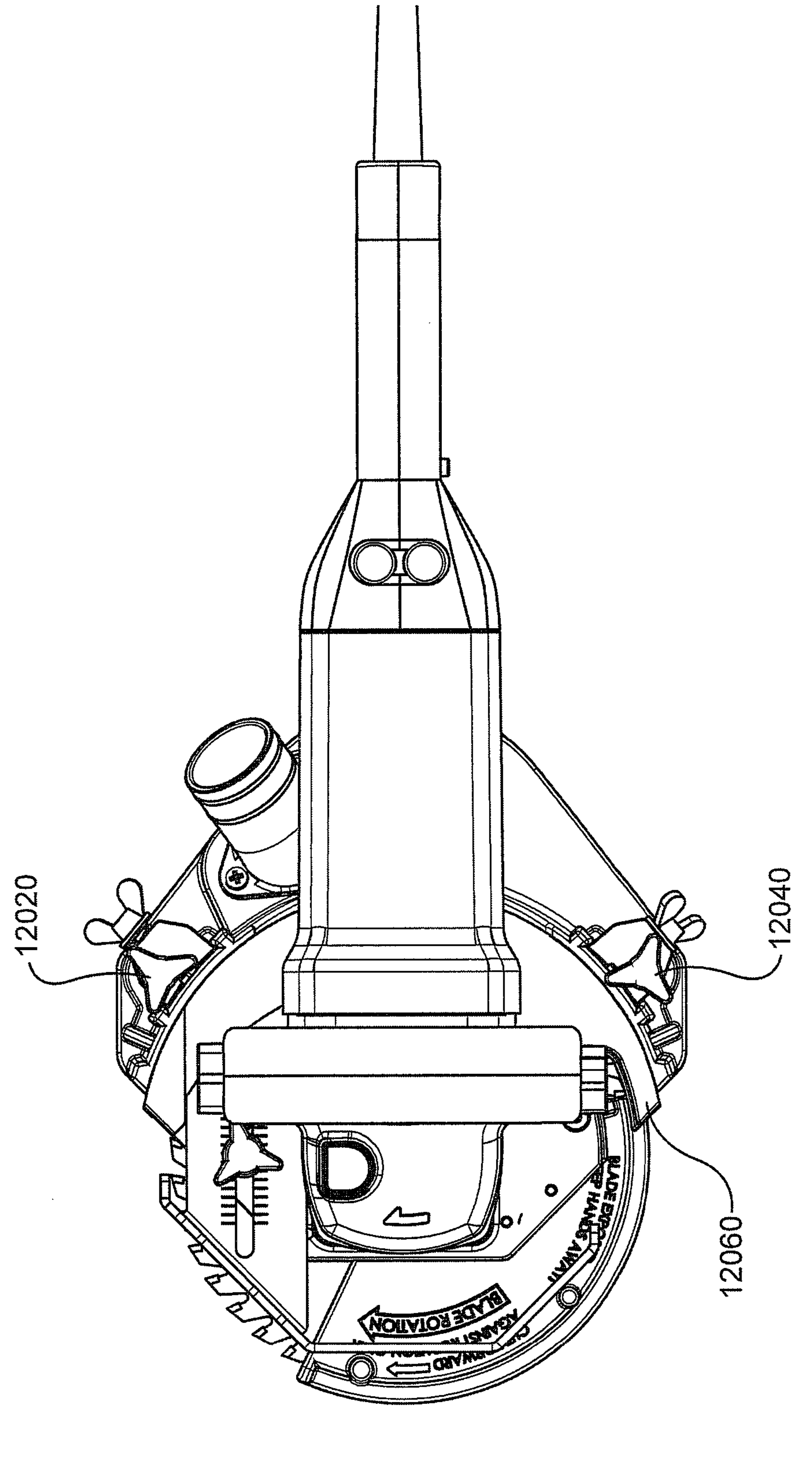
FIG. 12 is a top view of an undercut saw showing preferred locations of two lead screw mechanisms.

The lead screw mechanism formed by a threaded member such as pan head screw 8060 and tapped hole 8040 may be included in one or more of the guide washers included in the fixed guard assembly for the saw. As shown in FIG. 12, in this embodiment, two lead screw mechanisms 12020, 12040 are used. A single lead screw mechanism would not evenly lift both sides of the top plate 12060. With two such mechanisms 12020, 12040, the user may use both hands to turn the two knobs each by equal amounts of turn, resulting in uniform level height adjustment. Furthermore, two such mechanisms 12020, 12040 provide adequate support for top plate 12060 during use of the saw. With three or more such mechanisms, each knob would have to be turned separately, which is cumbersome.

In addition to the added lead screw mechanism supporting the height of the guide washer, the guide washer may also include additional frictional mechanisms to further assist in holding the desired height of cut. As shown in FIG. 8, as previously described, such a frictional mechanism may include a guide washer fastener assembly (such as wing screw 8160, washer 8180, and spring 8200 threading into tapped hole 8220 of the downwardly protruding back edge 8280 of top plate 8240). This guide washer fastener assembly works in conjunction with guide washer 8020 to frictionally hold a desired height of cut. The addition of this frictional mechanism is preferred because the lead screw mechanism alone may slip due to vibration or accidental bumping of one of the knobs.

In this embodiment as shown in FIG. 8, the process of height adjustment is somewhat different. First, the user loosens wing screw 8160, reducing the frictional hold. However, since pan head screw 8060 is threaded through tapped hole 8040 in guide washer 8020, top plate 8240 is held at that elevation until three arm knob 8140 is turned. If three arm knob 8140 is turned clockwise, pan head screw 8060 will be turned clockwise, thereby raising guide washer 8020 and top plate 8240 to a higher elevation above base plate 8100. If three arm knob 8140 is turned counter-clockwise, guide washer 8020 and top plate 8240 will be lowered. When the desired height is set, wing screw 8160 may again be tightened, and top plate 8240 and height adjustment skirt 8100 will additionally become frictionally held at the desired elevation.

In embodiments including both this type of lead screw mechanism as well as a guide washer fastener assembly for frictional holding force (such as wing screw 8160), the guide washer preferably includes a guide washer slot runner such as guide washer slot runner 8025. In such an embodiment, guide washer slot runner 8025 performs a different function in that it prevents guide washer 8020 from rotating when lifting force is applied by pan head screw 8060. The reason such rotation is generated and is not preferred is as follows: Tapped hole 8040 for pan head screw 8060 is offset at least some distance from through hole 8300 for passage of wing screw 8160 through guide washer 8020. Otherwise, these components would interfere with each other and not perform their desired function. With this offset, in the absence of guide washer slot runner 8025, pan head screw 8060 would lift guide washer 8020 on one side, causing it to rotate on wing screw 8160. An added feature on guide washer 8020 resists such rotation. An added guide washer slot runner 8025 can bear against the inner edges of slot 8290 during adjustment, thus preventing such undesirable rotation. Therefore, in such an embodiment, guide washer slot runner 8025 performs an important, though somewhat different function.

As previously explained, pan head screw 8060 is rotatably affixed to base 8100 of height adjustment skirt 8120 by collar 8210. Collar 8210 is affixed to pan head screw 8060 at a slight elevation above a surface 8260 on a top face of base 8100 forming a slight gap that permits such rotation. However, when the saw is lifted off the floor, collar 8210 performs the additional function of stopping pan head screw from sliding through countersunk hole 8080 through base 8100. Collar 8210 is affixed to pan head screw 8060 by means of a set screw 8211 which may be tightened down on the threads of pan head screw 8060 at the desired height. However, collar 8210 is an expensive custom component with a set screw 8211 which may come loose and cause the assembly to fail.

Figure 13:
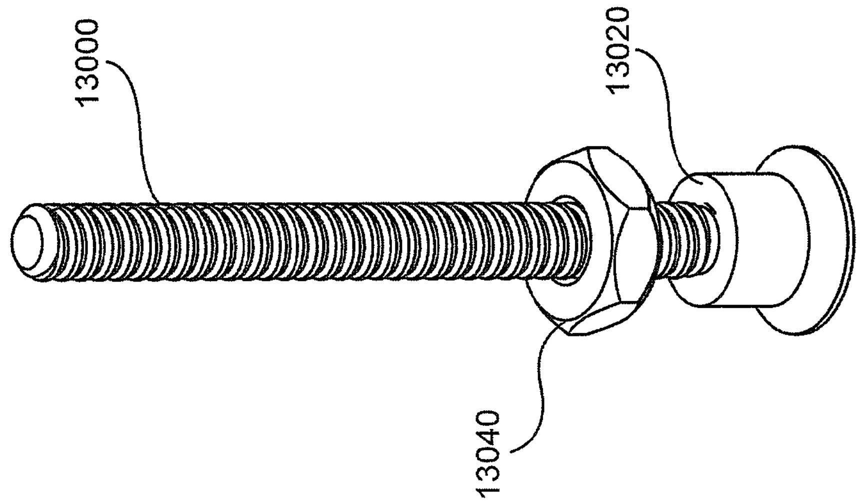
FIG. 13 is a perspective view of a shoulder pan head screw.
Figure 14:
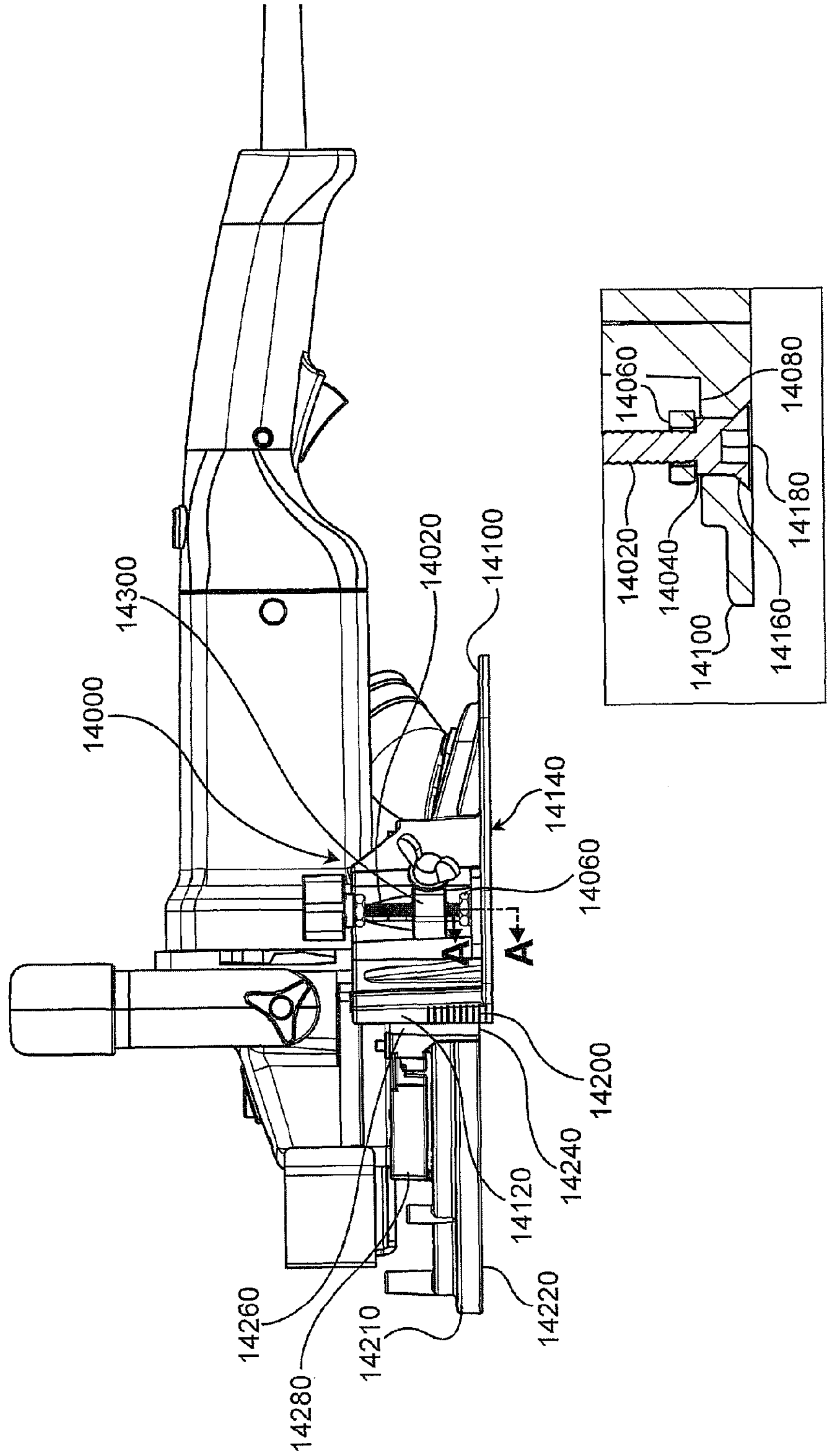
FIG. 14 shows a section view of an undercut saw showing how a shoulder pan head screw may be rotatably mounted to the base using a hex nut.

As shown in FIG. 13, an alternative pan head screw such as shoulder pan head screw 13000 may be used that includes a shoulder 13020. Shoulder 13020 spaces a standard hex nut such as hex nut 13040 at a desired height allowing shoulder pan head screw 13000 to rotate within its hole. FIG. 14 shows a partial section A-A of the area of base 14100 near the countersunk hole for a shoulder pan head screw 14020. As shown in section A-A, shoulder 14040 of shoulder pan head screw 14020 supports a common hex nut 14060 at a height above a top surface 14080 of base 14100. Thus, hex nut 14060 can be tightened down firmly on shoulder 14040 with reduced concern for coming loose compared with collar 8210 (FIG. 8). Hex nut 14060 is also less expensive than collar 8210 (FIG. 8). Thus, for two reasons, shoulder pan head screw 14020 and hex nut 14060 are preferred. However, as shown in FIG. 14, the insertion of either type of pan head screw within a countersunk hole (such as countersunk hole 14160) results in a flush surface such as 14140 on the bottom side of the base of the height adjustment skirt. A flush surface is preferred so that the bottom side of the base will not hang up on floor surface irregularities. Hex socket 14180 allows shoulder pan head screw 14020 to be turned with a hex wrench from the bottom if desired.

During height adjustment, as shown in FIG. 14, graduations 14200 may be etched on an outer surface on either side of height adjustment skirt 14120. These graduations indicate the height of the circular saw blade 14220 by its relation to a flush bottom edge 14240 of the downwardly protruding back edge 14260 of the top plate 14280. This is because the flush bottom edge 14240 is in the same flush plane with circular saw blade 14220 (covered in this view by movable guard 14210). Before performing an undercutting operation, the user may check on both front sides of the height adjustment skirt 14120 that the flush bottom edge 14240 of top plate 14280 is at the same graduation. This ensures that the blade is not angled in relation to a flat floor surface upon which the saw is to be placed.

As defined herein, for the embodiments of FIG. 8 or 14, or any embodiments including a lead screw mechanism to support a top plate, the lead screw component (such as pan head screw 8060 of FIG. 8, or shoulder pan head screw 13000 of FIG. 13, or shoulder pan head screw 14020 of FIG. 14) will be referred to as a lead threaded member. Furthermore, the fastener used to fasten the threaded member to the base of the height adjustment skirt (such as collar 8210 of FIG. 8, hex nut 13040 of FIG. 13, or hex nut 14060 of FIG. 14) will be defined as a lead threaded member holding fastener. A guide washer including a threaded hole (such as tapped hole 8040) in guide washer 8020 of FIG. 8 will be referred to as a lead guide washer.

Figure 5:
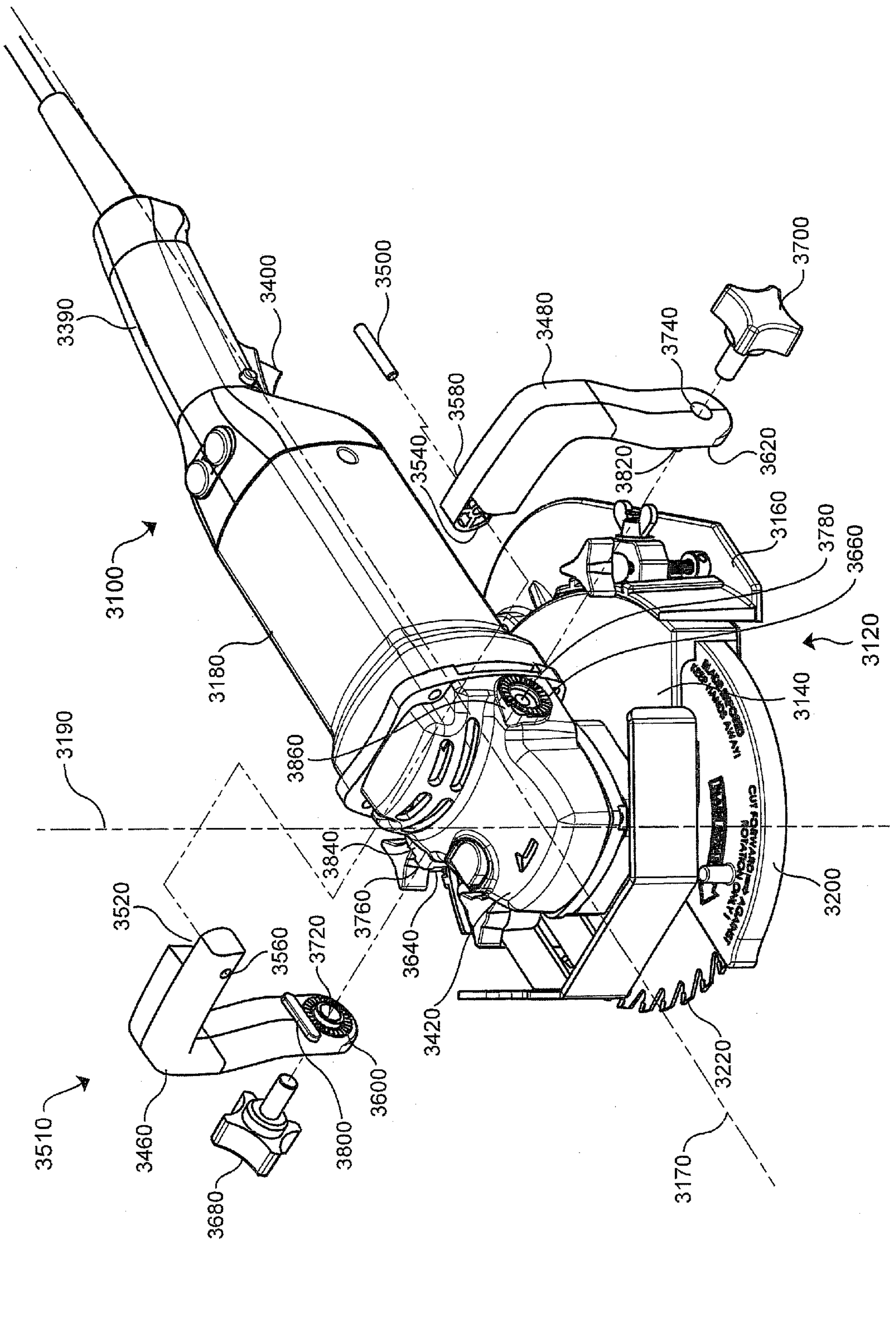
FIG. 5 is a perspective view of an improved, two-part pivoting handle for an undercut saw with a circular pattern of teeth which can be interlocked with a corresponding pattern of teeth on the spindle housing.

To provide an improved handle for grinder-activated undercut saws, the second, forward, movable handle may be formed from two parts joined by a pivot pin. A toothed surface may be formed on at least one inside surface of a handle which may interlock with a corresponding toothed surface formed on an outer surface of the grinder motor spindle housing. As with existing saws of this kind, and as shown in FIG. 5, undercut saw 3100 is made with a grinder motor 3180 having a first long horizontal armature axis 3170 and a second spindle axis 3190. On one end of the long armature axis, a first rearward handle 3390 with a switch 3400 forms the back end of the saw. On the other end, an aluminum spindle housing 3420 forms the front end and houses the spindle. The spindle (not shown) is operatively coupled to the armature (not shown) at a substantially right angle. A circular saw blade 3220 is mounted on the spindle on a blade mount (not shown). Spindle housing 3420 is fixedly joined to top plate 3140. Top plate 3140 and height adjustment skirt 3160 form a fixed guard assembly 3120 for the undercut saw. A spring-loaded movable guard 3200 covers circular saw blade 3220 and is retractable in the counter-clockwise direction to start a cutting operation.

The improved handle for the saw is formed from a first, left half 3460, a second, right half 3480, and an upper pivot pin 3500. Left half 3460 is overlapped at relief 3520 with relief 3540 in right half 3480. Pivot pin 3500 is press fit into upper hole 3580 in right half 3480 and through upper hole 3560 in left half 3460 to join the two halves. Thus, the two halves may be pivoted closed to enable interlocking of the circular tooth patterns on the handle and the spindle housing, or pivoted open to permit disengagement or disassembly. This assembly of the left half 3460 and right half 3480 with pivot pin 3500 may be referred to as handle assembly 3510.

Left half 3460 and right half 3480 have circular tooth patterns 3600 and 3620 (respectively) formed on their inside surfaces which may engage corresponding circular tooth patterns 3640, 3660 on the left and right hand sides of spindle housing 3420 (respectively). Threaded four arm screws 3680, 3700 may be inserted through left mounting hole 3720 in left half 3460 and right mounting hole 3740 in right half 3480 (respectively). Threaded four arm screws 3680, 3700 may further thread into a tapped left mounting hole 3760 and tapped right mounting hole 3780 to join handle assembly 3510 to spindle housing 3420.

Figure 11:
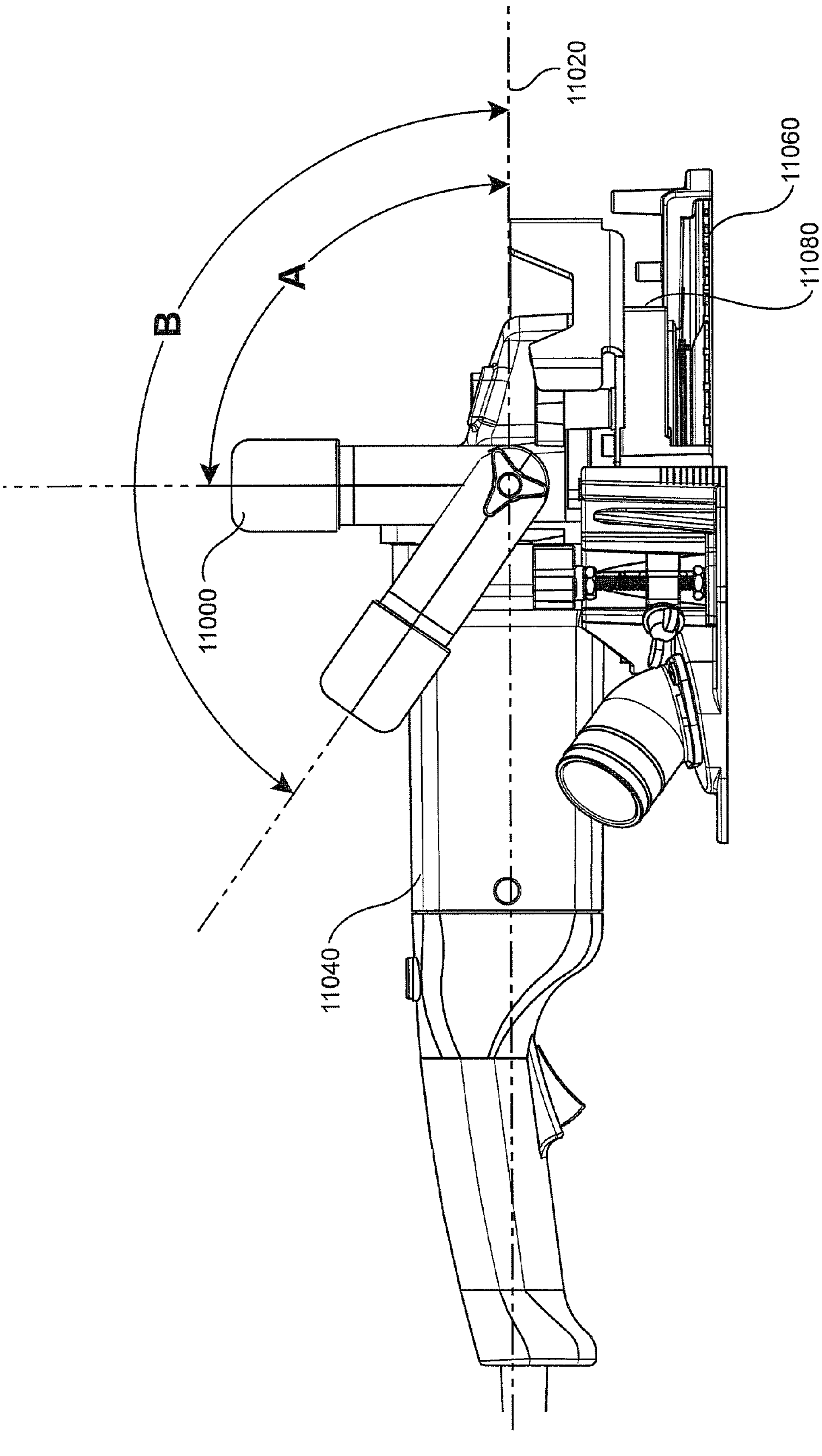
FIG. 11 is a side view of an assembled undercut saw having a grinder motor for its power unit showing two preferred angles in the orientation of the forward handle.

The circular tooth patterns 3600, 3620 of left half 3460 and right half 3480 are designed to interlock with corresponding circular tooth patterns 3640, 3660 in the left and right sides of spindle housing 3420 and will provide a fixed and solid joint when they are pressed together by threaded four arm screws 3680, 3700. Because these teeth patterns are circular, handle assembly 3510 may interlock and become fixedly joined to spindle housing 3420 at a number of angles. As more clearly illustrated in FIG. 11, for general undercutting, it is preferred that handle assembly 11000 be oriented at a right angle A perpendicular to the long armature axis 11020 of grinder motor 11040. This provides comfortable knuckle clearance and firm grip. However, when undercutting in low clearance areas, such as underneath toe spaces, it is preferred that the handle be angled back or at an angle greater than a right angle in relation to a forward projection of the long armature axis of the saw, such as angle B. However, it is further preferred that handle assembly 11000 be restricted from being set or moving unexpectedly to any angle which is less than a right angle in relation to a forward projection of the long armature axis 11020 of the saw. Any such acute angle places the hand unnecessarily close to blade 11060, and could also cause the handle to extend beyond the front edge of top plate 11080. Such is not preferred, as that would prevent the saw from operating in tight areas, such as inside corners.

As shown in FIG. 5, others skilled in the art will envision alternative fasteners to fasten a second, forward, movable handle, such as handle assembly 3510, to an undercut saw spindle housing, such as spindle housing 3420. For example, rather than four arm screws 3680, threaded rods may be threaded into tapped left mounting hole 3760 and tapped right mounting hole 3780. Threaded nuts having tapped holes may be threaded onto the ends of the threaded rods. The use of such threaded rods would make it more difficult for the user to remove the handle and use the saw without a handle. Any such fasteners used to fasten a handle or handle assembly to a spindle housing will be referred to herein as handle fastening fasteners. Handle fastening fasteners may include a single fastener or a combination of fasteners combining for this purpose.

As shown in FIG. 5, to prevent handle assembly 3510 from moving or being set at any such acute angle in relation to a forward projection of the long armature axis of the saw, left half 3460 and right half 3480 include bosses 3800, 3820. When handle assembly 3510 is joined to spindle housing 3420 at a right angle to long armature axis 3170, bosses 3800, 3820 come in close proximity to left and right flats 3840, 3860 of spindle housing 3420. In this embodiment, if handle assembly 3510 is rotated forward to an acute angle in relation to the long armature axis 3170, bosses 3800, 3820 will contact left and right flats 3840, 3860. This interference causes handle assembly 3510 to tip forward, displacing the teeth and preventing them from interlocking. Hence, the handle cannot be mounted on the spindle housing at such an angle. In other embodiments with a freely pivoting handle assembly, bosses 3800, 3820 may contact left and right flats 3840, 3860 to stop the handle from being rotated forward to any such acute angle.

Left half 3460 and right half 3480 may be economically produced as aluminum castings and will easily handle much greater pushing force than existing U-shaped undercut saw handles fastened by lock washers and bolts. A flexible rubber coating such as plastisol may be added to form a softer, slip-resistant gripping surface on the outer surface of handle assembly 3510.

Figure 6:
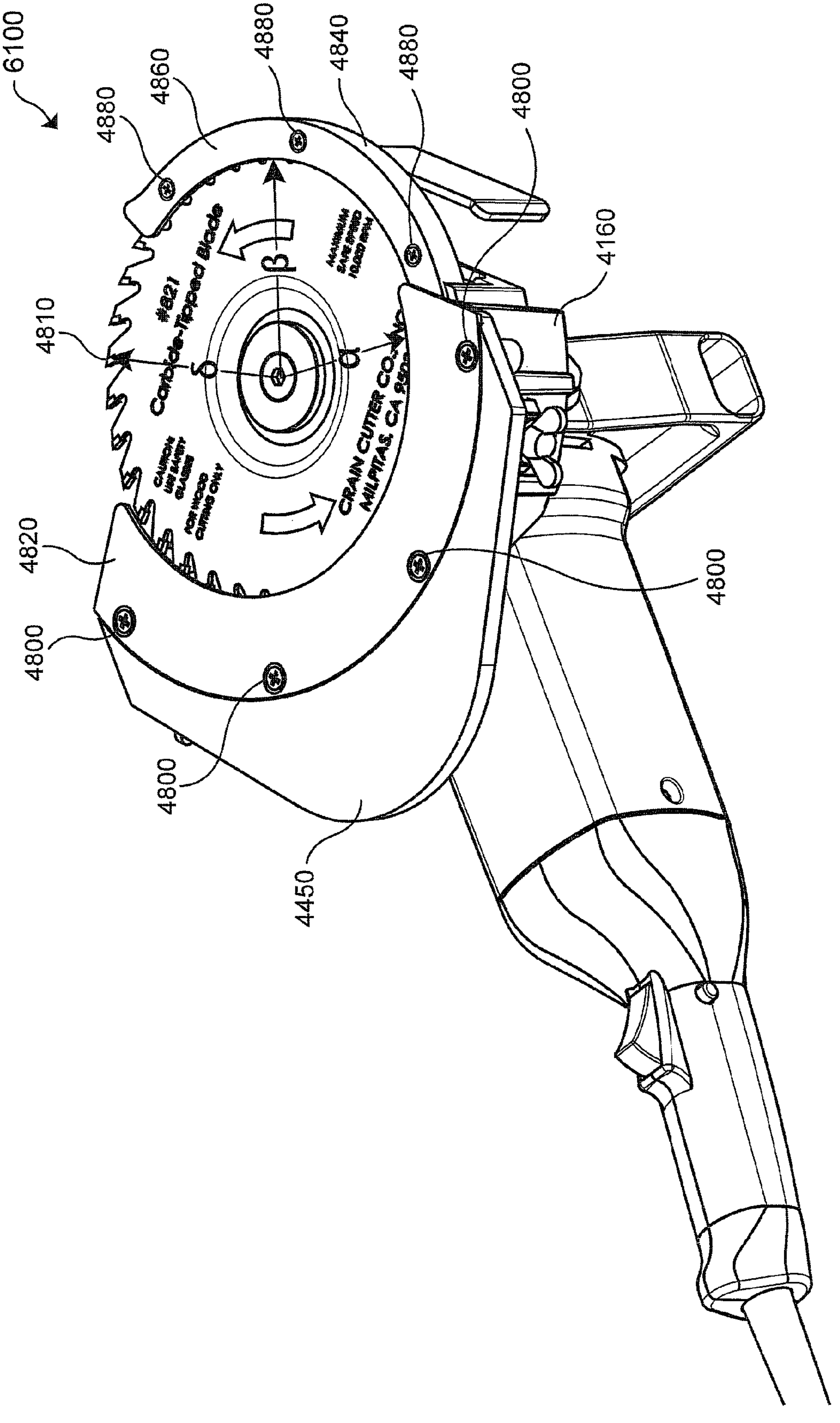
FIG. 6 is a bottom view of an undercut saw showing a removable cover plate mounted on the base of the height adjustment skirt, and a removable cover plate on the movable blade guard.

To add removable guarding structures to the bottom portion of the fixed guard of the undercut saw, removable cover plates may be added to any of the height adjustment skirt, movable guard, or top plate. Such removable cover plates may be positioned so as to cover at least a portion of the circumference of the blade past the depth of the teeth. As shown in FIG. 6, undercut saw 6100 has a height adjustment skirt 4160 having a base 4450. An additional flush mounted removable cover plate 4820 may be screwed to base 4450 using screws 4800. Cover plate 4820 covers blade 4810 past the depth of the teeth. In addition, movable guard 4840 may cover the blade 4810 past the depth of the teeth with its own removable plate 4860 fastened to movable guard 4840 as by screws 4880.

As defined herein, in relation to cover plates which may cover the blade, the phrase "past the depth of the teeth" shall describe a cover forming a radius as measured from the center of the circular saw blade which is shorter than a radial distance to the outermost circumference of the circular saw blade. For example, cover plate 4820 mounted on base 4450 covers blade 4810 to a radius alpha (in relation to the center of the circular saw blade 4810). Radius alpha is a shorter radius than radius delta to the outer circumference of the circular saw blade 4810. Similarly, cover plate 4860 mounted on movable guard 4840 covers blade 4810 to a radius beta (in relation to the center of the circular saw blade 4810). Radius beta is a shorter radius than radius delta.

Figure 7:
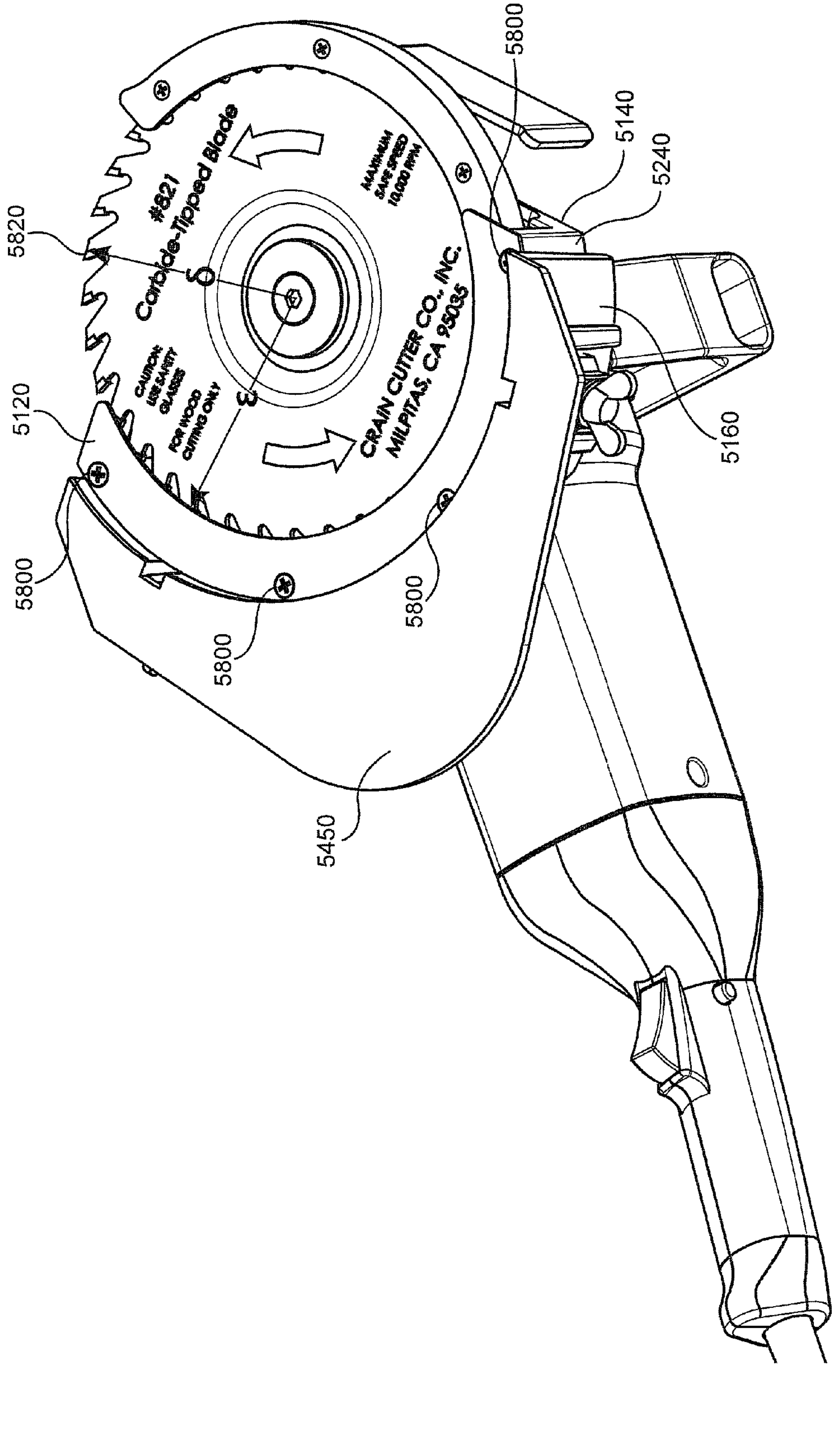
FIG. 7 shows a removable cover plate mounted on the bottom of the downwardly protruding back edge of the top plate.

In an another embodiment, as shown in FIG. 7, a cover plate 5120 may be removably mounted on a bottom edge of the downwardly protruding back edge 5240 of the top plate 5140 using screws 5800, rather than on the base 5450 of height adjustment skirt 5160. Cover plate 5120 covers, blade 5820 past the depth of the teeth. Cover plate 5120 covers blade 5820 to a radius epsilon. Radius epsilon is a shorter radius than radius delta (the outer circumference of the circular saw blade 5820).

Figure 1:
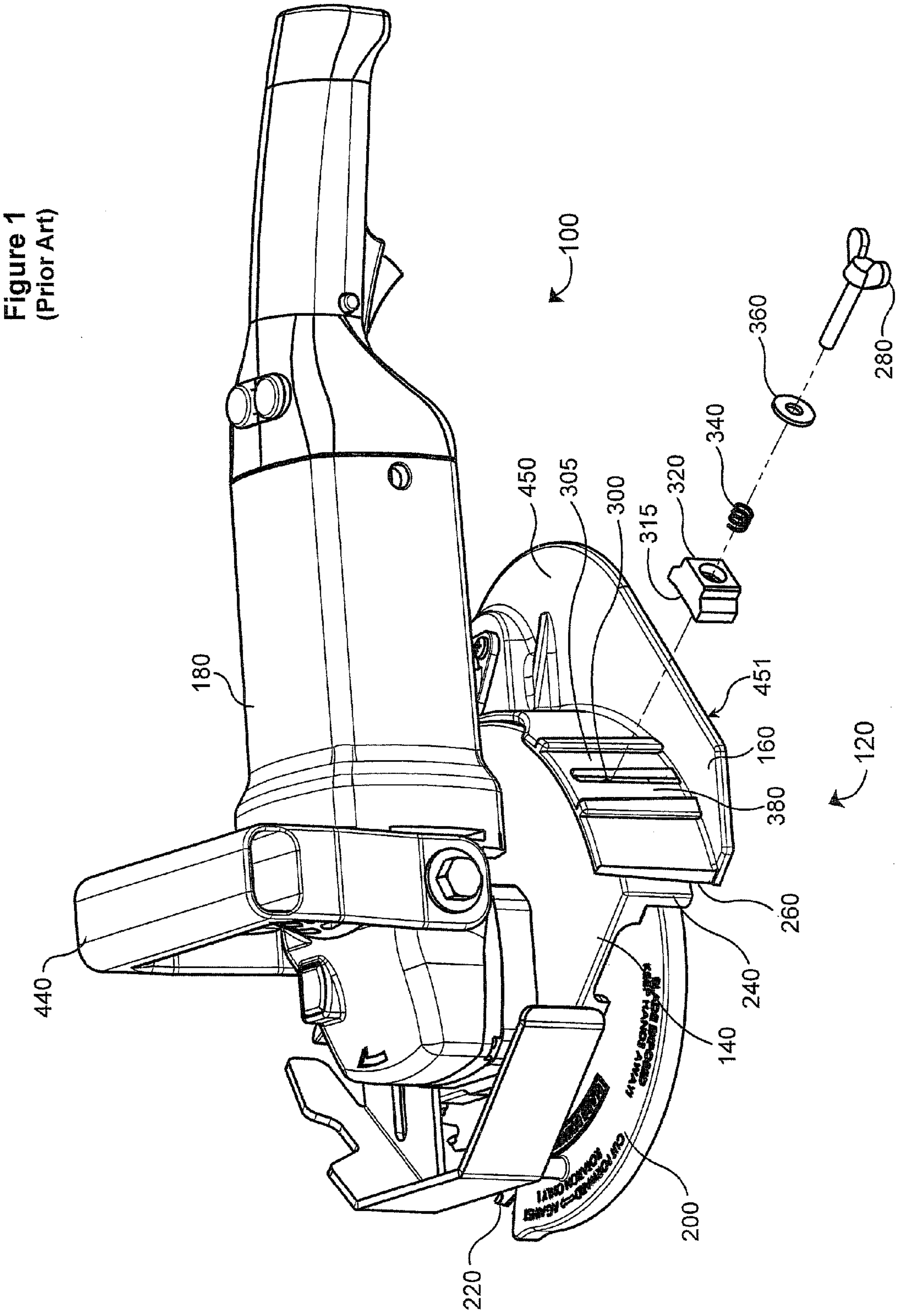
Figure 1 (Prior Art)
FIG. 1 is a side perspective view of an existing undercut saw showing existing guide washers and guide washer mounting hardware such as wing screws.
Figure 2:
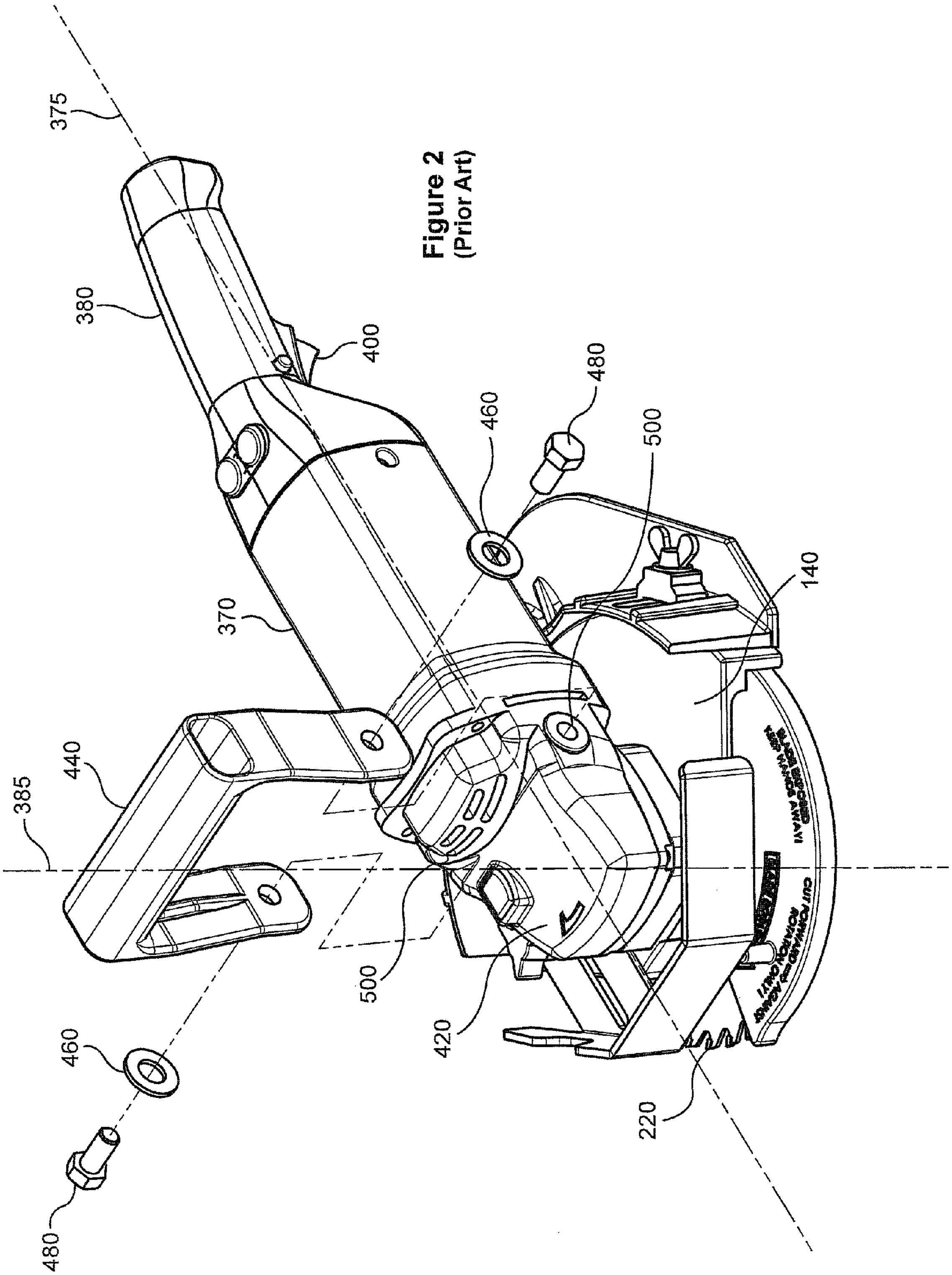
Figure 2 (Prior Art)
FIG. 2 is perspective view of an existing undercut saw using a grinder motor as a power unit and an existing U-shaped handle mounted to the spindle housing using bolts and lock washers.

It will be apparent that various alternatives may be implemented. The Detailed Description discloses a number of additional features, any one of which may be added alone or in any combination to an undercut saw to improve saw design. The handle features and the blade height features may be used separately or together. Although FIG. 4 illustrates a grinder type saw, the embodiments and features may easily be adapted to other undercut saw configurations, including a circular saw type configuration. The materials, dimensions and positioning are purely exemplary, and numerous alternatives exist. In FIGS. 1-3, existing saws are shown, including one having a dust port. The present embodiments and features may be adapted to such saws, to undercut saws having stabilizing features. The handle may be adapted to a number of different tools, some of which are not undercut saws. The improvements to the telescoping height adjustment skirt could be implemented on any tool having a telescoping height adjustment skirts. These are some exemplary alternatives; this is not an exhaustive list of the alternatives that are possible with the present invention.

What is claimed is:

1. An undercut saw configured to cut a substantially vertical wall surface while a fixed blade guard assembly moves across a substantially horizontal floor surface on which said undercut saw is placed, said undercut saw comprising:

- a rotary power unit having a motor housing;
- at least one handle on said motor housing;
- a motor housed within said motor housing;
- a drive shaft rotated by said motor;
- a blade mount mechanically linked to said drive shaft such that when said drive shaft is rotated by said motor, said blade mount is rotated such that when a blade is mounted on said blade mount, said blade is rotated;
- a fixed blade guard assembly joined to said motor housing, said fixed blade guard assembly circumscribing a portion of said circular saw blade when said circular saw blade is mounted on said blade mount, said fixed blade guard assembly including:
- a top plate fixedly joined to said motor housing, said top plate including a fastener hole;
- a height adjustment skirt in telescoping attachment to said top plate, said height adjustment skirt including a fastener slot through to said fastener hole in said top plate;
- a lead guide washer including a substantially horizontal hole alignable with a guide washer slot in said height adjustment skirt and said fastener hole in said top plate, and including a substantially vertical tapped hole, said lead guide washer including a guide washer slot runner insertable within a slot in said height adjustment skirt, said lead guide washer having a shape including a side flanged surface, wherein said substantially vertical tapped hole is located on said side flanged surface, and wherein a centerline of said substantially horizontal hole is non-intersecting with a centerline of said vertical tapped hole;
- a guide washer fastener assembly fastenable into said fastener hole in said top plate, through said slot in said height adjustment skirt, and through said horizontal hole in said lead guide washer;

said guide washer fastener assembly configured such that when in a tightened position it will hold said top plate against an inner surface of said height adjustment skirt, and it will hold said lead guide washer against an outer surface of said height adjustment skirt, such that said top plate is frictionally held against said height adjustment skirt;

said guide washer fastener assembly configured such that when in a loosened position said top plate will telescope in relation to said height adjustment skirt; and a lead threaded member threadable into said substantially vertical tapped hole in said lead guide washer, said lead threaded member rotatably fastened to said height adjustment skirt;

wherein when said guide washer fastener assembly is in a loosened position, said top plate is raised or lowered by said lead guide washer and said guide washer fastener assembly being raised or lowered by turning said lead threaded member.

2. The undercut saw of claim 1 wherein a face of said lead guide washer rests flush against a guide washer channel of said height adjustment skirt.

3. The undercut saw of claim 1 wherein the lead threaded member is rotatably fastened to said height adjustment skirt at one end and is rotatable at another end.

4. The undercut saw of claim 1 wherein said guide washer slot runner prevents said guide washer from rotating when said lead threaded member applies a force to said guide washer.

5. The undercut saw of claim 1 wherein said guide washer slot runner can bear against inner edges of said slot in said height adjustment skirt during adjustment, preventing rotation of the guide washer.

6. The undercut saw of claim 1 further comprising:

a second lead guide washer including a second substantially horizontal hole alignable with a second guide washer slot in said height adjustment skirt and a second fastener hole in said top plate, and including a second substantially vertical tapped hole; and a second lead threaded member threadable into said second substantially vertical tapped hole in said second lead guide washer.

7. The undercut saw of claim 1 wherein:

said lead threaded member supports an adjusted height of said lead guide washer; and said guide washer fastener assembly in conjunction with said lead guide washer frictionally holds said adjusted height of said lead guide washer.

8. The undercut saw of claim 1 wherein when the lead threaded member is threaded into said substantially vertical tapped hole in said lead guide washer, the lead threaded member extends outside of a top of said substantially vertical tapped hole at one end and outside of a bottom of said substantially vertically tapped hole at another end.

* * * * *